United States Patent [19]
Hollnagel

[11] 3,899,036
[45] Aug. 12, 1975

[54] SNOWMOBILE SKI SUSPENSION ASSEMBLY

[76] Inventor: Harold E. Hollnagel, 10229 N. River Rd. 43W, Mequon, Wis. 53092

[22] Filed: Nov. 12, 1973

[21] Appl. No.: 414,900

[52] U.S. Cl.................... 180/5 R; 280/25; 244/108
[51] Int. Cl.².......................................... B62M 27/00
[58] Field of Search............ 180/5 R; 280/12 R, 25, 280/27, 28; 305/44; 244/108

[56] References Cited
UNITED STATES PATENTS

| | | | |
|---|---|---|---|
| 1,891,188 | 12/1932 | Stalb.................... | 180/5 R |
| 2,108,541 | 2/1938 | Lull..................... | 280/12 R |
| 3,603,575 | 9/1971 | Arlasky................ | 180/5 R |
| 3,613,812 | 10/1971 | Hetteen................ | 180/5 R |
| 3,623,564 | 11/1971 | Higginbotham....... | 180/5 R |
| 3,674,103 | 7/1972 | Kiekhaefer........... | 180/5 R |
| 3,724,578 | 4/1973 | Erickson.............. | 180/5 R |
| 3,760,895 | 9/1973 | Martinmaas.......... | 180/5 R |
| 3,786,886 | 1/1974 | Bombardier.......... | 180/5 R |
| 3,800,896 | 4/1974 | Albertson............. | 280/25 |

Primary Examiner—Philip Goodman
Assistant Examiner—John A. Carroll
Attorney, Agent, or Firm—McGlynn and Milton

[57] ABSTRACT

A suspension assembly adapted for attachment between the vehicle ski and the vehicle body of a ski-supported vehicle including a lever arm member pivotally attached to a support structure mounted to the ski, a resilient member, such as a coil spring and hydraulic piston combination, operably connected between the lever arm member and the support structure for resisting the pivotal motion of the lever arm member, a pivotal attachment between the lever arm member and the vehicle body, and a lost motion connection for limiting the pivotal motion between the pivotal attachment and the lever arm member to permit the front of the ski to pivot upwardly from its normally horizontal position, but to preclude the front of the ski from pivoting downwardly from the horizontal position.

29 Claims, 7 Drawing Figures

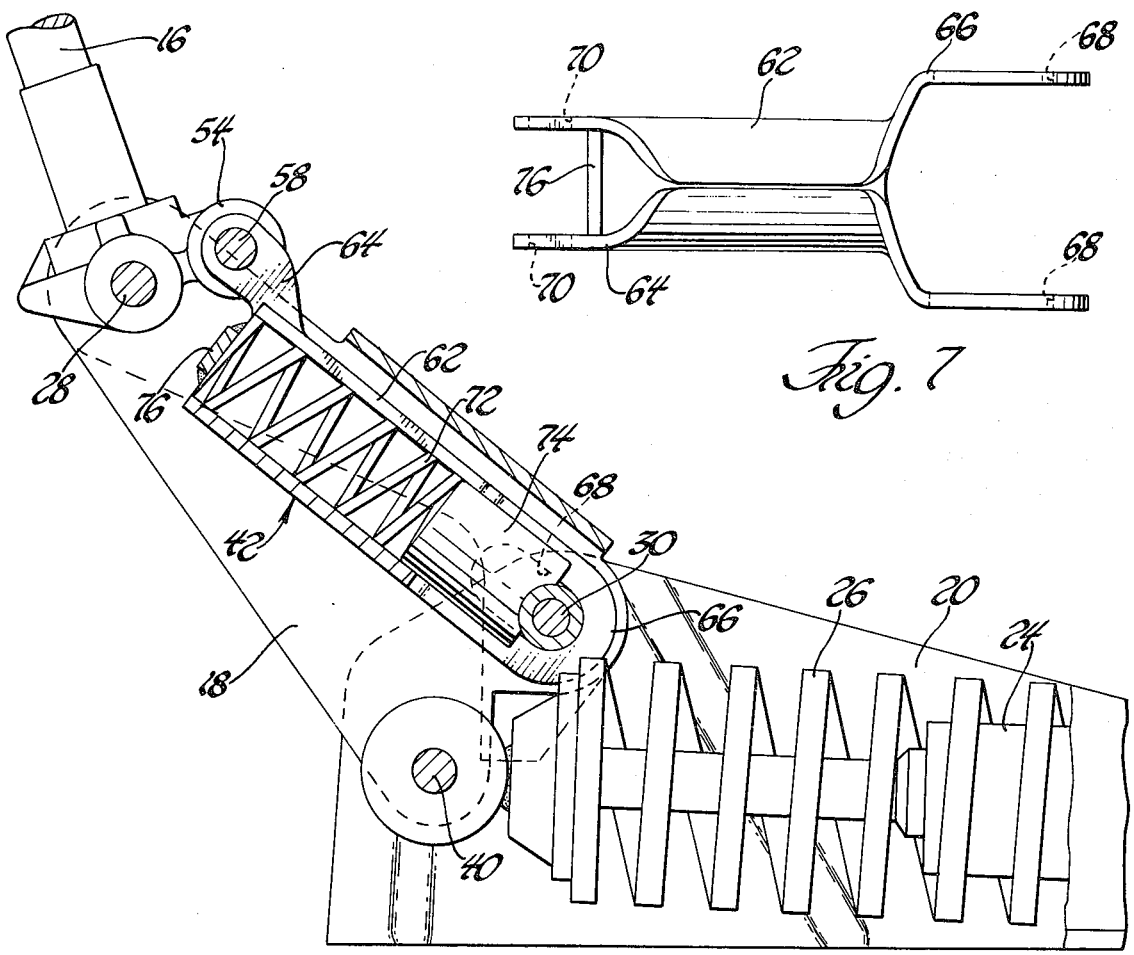
Fig. 7
Fig. 5
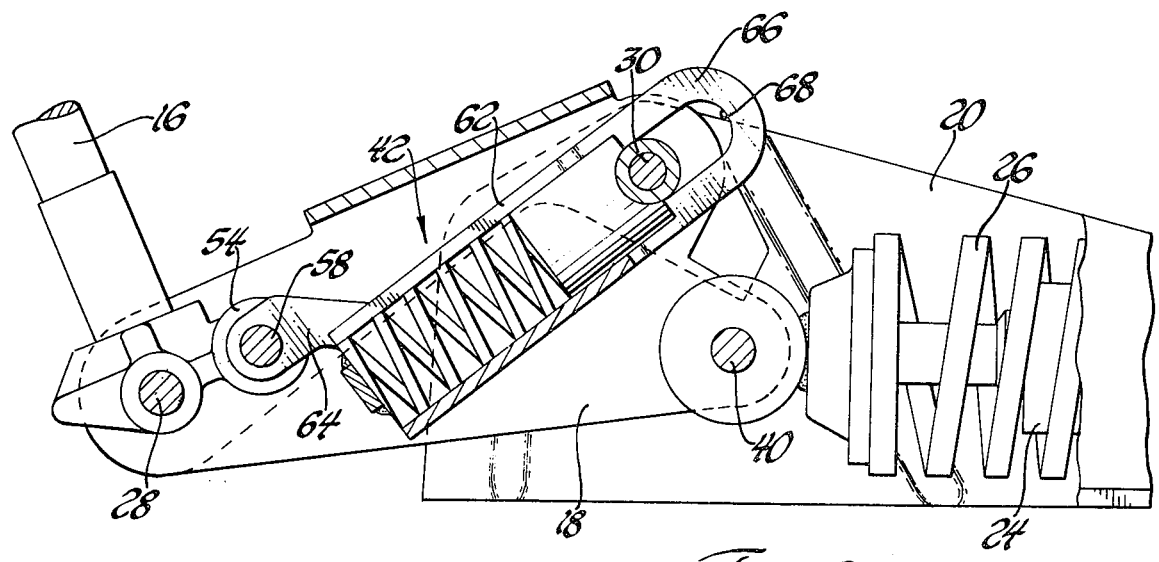
Fig. 6

SNOWMOBILE SKI SUSPENSION ASSEMBLY

This invention relates to a suspension assembly for a ski-supported vehicle such as a snowmobile or the like. In vehicles of the type referred to, a suspension assembly is disposed between the vehicle ski and the vehicle body to absorb shocks and cushion the ride of the vehicle as it passes over rough terrain. A suspension assembly of this type, to which the instant invention comprises an improvement, is disclosed in my co-pending application U.S. Ser. No. 342,017 filed Mar. 16, 1973 now U.S. Pat. 3,854,541.

As stated above, the primary purpose of the suspension assembly is to cushion the ride of the vehicle while it is traveling over rough terrain by absorbing shocks to the ski. In addition to absorbing the shocks to the ski, it is also desirable to control the position of the ski relative to the vehicle. Normally, the ski is attached to a steering spindle through the suspension assembly. The steering spindle is rotatable through a steering device manipulated by the operator of the vehicle to control the position of the ski in a horizontal plane which, of course, enables control of the direction of travel of the vehicle.

In most cases, the connection between the suspension assembly and the steering spindle is a pivotal one which permits the ski to pivot about its midpoint in a vertical plane. Consequently, in the event that the snowmobile becomes airborne, whch is oftentimes the case when traveling over rough terrain, the front end of the ski tends to drop downwardly causing the tip of the ski to dig into the snow upon landing. This can result in serious damage to the snowmobile and injury to the operator. It is desirable, therefore, to control the pivotal motion of the ski in the vertical plane to prevent the front end of the ski from dropping substantially below the horizontal plane. Merely providing a solid non-pivotal connection between the steering spindle and the suspension assembly will not suffice, however, since the tip of the ski must have the ability to pivot upwardly with respect to the horizontal plane to accommodate differences in the terrain.

Accordingly, it is a primary purpose of the instant invention to provide a suspension assembly adapted for attachment between the vehicle ski and the vehicle body preferably through the steering spindle wherein the suspension assembly includes a pivotal attachment between the vehicle body and the suspension assembly and lost motion connection means for limiting the pivotal motion between the pivotal attachment and the suspension assembly. The lost motion connection means is adapted to preclude downward pivotal motion of the front end of the ski substantially below the horizontal plane while permitting the front end of the ski to pivot above the horizontal plane.

Other purposes and functions of the instant invention will be readily appreciated as the same becomes better understood by reference to the following detailed description when considered in connection with the accompanying drawings wherein:

FIG. 5 is a broken away side elevational view of an alternate embodiment of a suspension assembly constructed in accordance with the instant invention;

FIG. 6 is a broken away side elevational view similar to FIG. 5 illustrating the elements in a moved position; and FIG. 7 is a plan view of an important element of the assembly.

Figure 1:
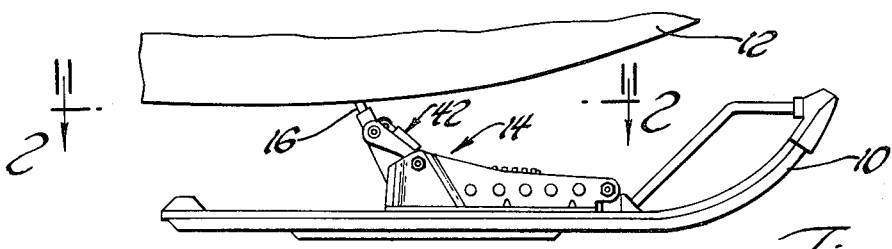
FIG. 1 is a side elevational view, partially broken away, of a snowmobile ski attached to a vehicle body through a suspension assembly constructed in accordance with the instant invention.
Figure 2:
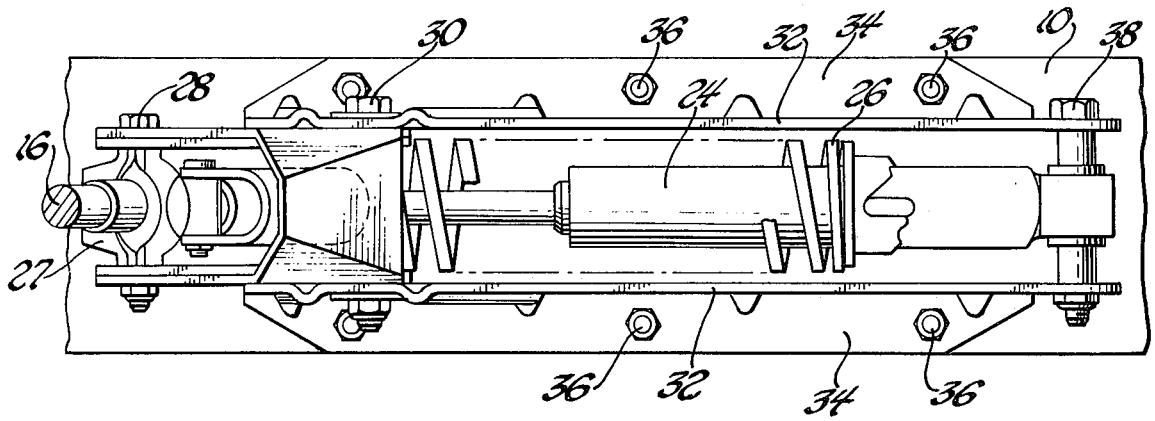
FIG. 2 is a view taken generally along line 2—2 of FIG. 1.
Figure 3:
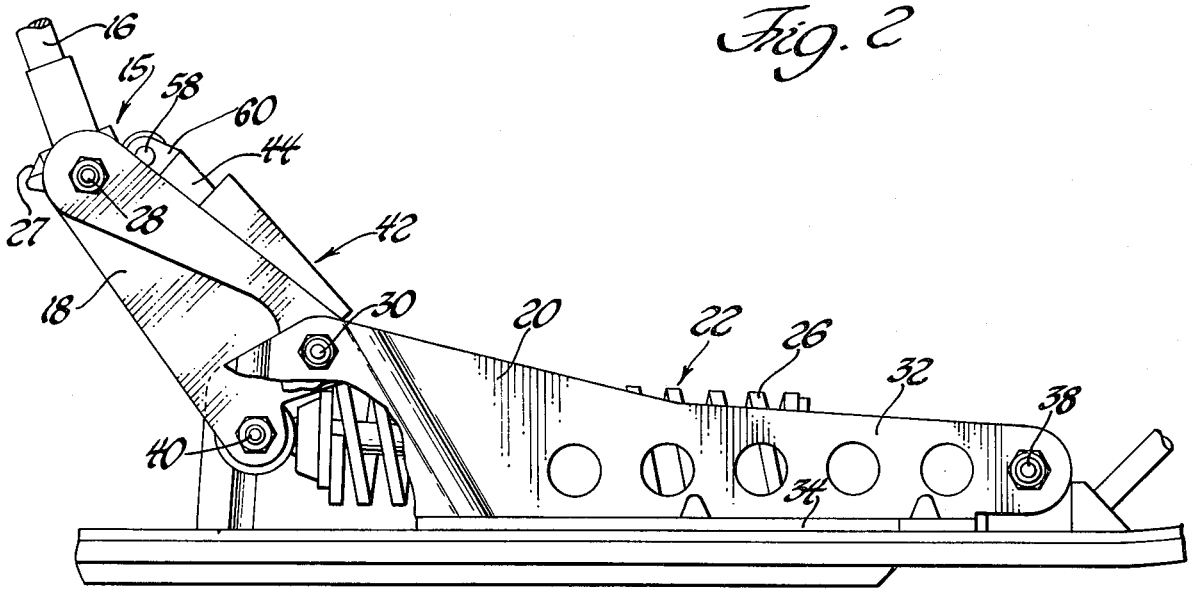
FIG. 3 is an enlarged side elevational view, partially broken away, similar to FIG. 1.

Referring to the drawings, and particularly FIG. 1, a snowmobile ski 10 is shown connected to the underside of a snowmobile body 12 through the suspension assembly generally indicated at 14. The suspension assembly 14 is connected by pivotal attachment means, generally indicated at 15, to a rotatable steering spindle 16 which is manipulated by the operator of the snowmobile through a suitable steering device (not shown) to rotate the ski 10 generally in a horizontal plane. This facilitates steering of the snowmobile since the ski is in contact with a surface, such as snow-covered ground. It is noted that while only a single ski 10 is shown attached to the body 12, this is merely illustrative and there may be two skis 10 as is the case in most recent snowmobile constructions.

By way of a general description, the suspension assembly 14 includes lever arm means 18 which is pivotally attached and supported by support means 20. Resilient means, generally shown at 22, which includes a hydraulic piston member 24 and a coil spring member 26 is connected between the lever arm means 18 and the support means 20 for resisting the pivotal motion of the lever arm means 18. The steering spindle 16 of the snowmobile 12 is pivotally attached to the lever arm means 18 by the pivotal attachment means 15 which includes a terminal block 27 on the end of the spindle 16 and a pivot shaft 28. Consequently, as the snowmobile 12 travels over rough terrain, the ski 10 is caused to reciprocate in a vertical plane which movement causes the lever arm means 18 to pivot about pivot shaft 30 on the support means 20. The pivotal motion is dampened and resisted by the hydraulic piston 24 and coil spring 26, thereby reducing the shock forces transmitted to the snowmobile 12.

More specifically, the support means 20 includes a pair of elongated upstanding flange members 32 which are adapted for mounting parallel to the axis of the ski 10. For this purpose, the flange members 32 include mounting means comprising a mounting flange 34 extending perpendicularly from the base of each of the flange members 32 which are connected by fastener members 36 to the ski 10. The support means 20 supports the lever arm means 18 through the pivot shaft 30 at one end thereof and supports a pivot shaft 38 at the other end thereof to which is connected one end of the resilient means 22. The opposite end of the resilient means 22 is connected to a pivot shaft 40 supported by the lever arm means 18. It is obvious from this description that pivotal motion of the lever arm means 18 about the pivot shaft 30 is resisted by the resilient means 22.

The foregoing description substantially describes the suspension assembly which comprises the subject matter of my copending patent application U.S. Ser. No. 342,017 now U.S. Pat. No. 3,854,541.

By way of explanation, and as hereinbefore stated, the steering spindle 16 is pivotally attached to the lever arm means 18 through the pivotal attachment means 15 including the pivot shaft 28 as is customary in suspension assemblies heretofore known. Consequently, if the snowmobile is airborne, the weight of the ski 10 tends to pivot the front end thereof downwardly from the horizontal position shown in FIG. 1. This downward rotation of the front end of the ski can cause the tip of the ski 10 to bury itself in the snow when the snowmobile 12 lands, and thereby possibly causing damage to the snowmobile 12 or injury to the operator. To avoid this problem, lost motion connection means, generally shown at 42, is provided for limiting the pivotal motion between the pivotal attachment means which connects the steering spindle 16 to the assembly 14.

One embodiment of the lost motion connection means 42 is shown in FIGS. 1 through 4 and includes a first member 44 pivotally connected to the attachment means 15 and a second member 46 pivotally connected to the support means 20, and preferably to the pivot shaft 30 of the lever arm means 18. The first and second members 44 and 46 are in telescoping relationship to permit relative motion therebetween. The first member 44 includes stop means comprising the flanges 48 which limits the outward telescopic motion between the first and second members 44 and 46 to a predetermined outwardmost position. In other words, the first and second members 44 and 46 are permitted to telescope outwardly only until the flanges 48 on the first member 44 engage the end of the second member 46. This situation exists when the elements are generally in the position shown in FIG. 3. That is, when the ski 10 is in a horizontal position, the first and second members 44 and 46 are prevented from further outward telescopic motion, thereby preventing the front end of the ski from dropping substantially below the horizontal position. However, since inward telescopic motion between the members is permitted, the front end of the ski 10 may be pivoted to a position above the horizontal. This allows accommodation for roughness in the terrain over which the ski 10 is traveling.

Additionally, spring means comprising the coil spring 50 is provided within the generally tubular members 44 and 46 to urge the members to the outwardmost position. Consequently, should the front end of the ski 10 be pivoted to a position above the horizontal plane, the coil spring 50 urges the ski 10 toward the horizontal position. To position the coil spring 50 within the members 44 and 46, the spring means is provided with seating plugs 52 disposed at each end of the coil spring 50. The seating plugs 52 include an arcuate groove for engaging and seating against an adjacent arcuate member. In this case, the arcuate grooves in the seating plugs 52 engage the cylindrical housings of the pivot shafts to which the members 44 and 46 are attached.

Figure 4:
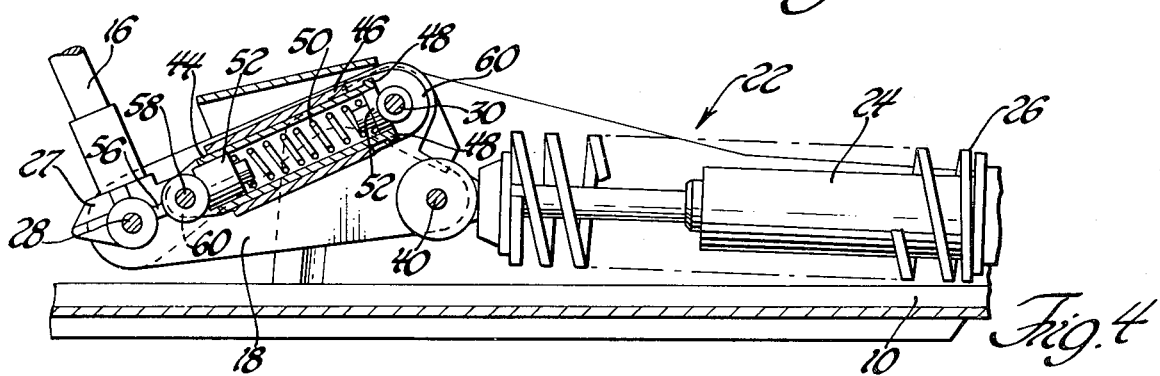
FIG. 4 is a broken away view similar to FIG. 3 and partially in cross-section illustrating the elements in a moved position.

In order to secure the first member 44 to the attachment means 15, a shaft housing 54 is mounted to the attachment means by a weldment 56 or other suitable fastening means. The shaft housing 54 houses a pivot shaft 58 to which the first member 44 is pivotally attached. The second member 46 is similarly pivotally attached to the pivot shaft 30 of the lever arm means 18. For this purpose, both the first and second members 44 and 46 are provided with a pair of axially extending, parallel connecting ears 60 for pivotally connecting the members to the respective shafts. It is noted that only one of the connecting ears 60 of each pair is shown in FIG. 4 since the lost motion connection means 42 is shown in cross-section. Suffice it to say, however, that each connecting ear 60 includes an aperture in axial alignment with the other connecting ear of the respective pair for receiving the pivot shaft therethrough.

FIG. 4 illustrates the relative movement of parts caused by the pivotal motion of the lever arm means 18. More specifically, as the lever arm means 18 pivots about pivot shaft 30 from the position shown in FIG. 3, the resilient means 22 is compressed due to its connection with the lever arm means 18. Simultaneously, the first and second members 44 and 46 of the lost motion connection means 42 telescope inwardly against the force of the coil spring 50. The position of the elements, as shown in FIG. 4, is the result of an extremely hard landing of the snowmobile 12. In other words, when the snowmobile ski 10 meets the ground, the weight of the snowmobile 12 is tranferred through the steering spindle 16 to the lever arm means 18 thereby forcing it to pivot about pivot shaft 30, which motion is resisted by the resilient means 22. After meeting the surface, the resilient means 22 will pivot the lever arm means 18 in the opposite direction, thereby returning the respective elements to the positions generally shown in FIG. 3.

It should be noted that when lesser shocks are encountered, that is, shocks which are not sufficient to cause pivotal motion of the lever arm means 18, the front end of the ski 10 is free to pivot about pivot shaft 28 through the same inward telescopic motion of the members 44 and 46 as described above. Consequently, it can be seen that the ski 10 is permitted to pivot about pivot shaft 28 in such a fashion that the front end of the ski is raised above the horizontal plane; however, pivotal motion of the ski 10 is precluded which would drop the front end of the ski 10 below the horizontal plane.

It is noted that the lost motion connection means 42 is required to permit pivotal motion of the lever arm means 18 about its pivot shaft 30 since the distance separating the lever arm pivot shaft 30 and the pivot shaft 58, to which the lost motion connection means is connected, diminishes. Therefore, if a solid connection were provided, the lever arm means 18 would be restricted from pivotal motion. In like fashion, the lost motion connection means 42 permits upward motion of the ski 10 from the horizontal plane since the ski can pivot about the pivotal attachment means 15.

Another embodiment of the lost motion connection means 42 is shown in FIGS. 5 through 7 wherein like numbers are employed to identify similar or identical elements in the embodiment illustrated in FIGS. 1 through 4.

The second embodiment of the lost motion connection means 42 includes a member 62 having pivotal connection means 64 and 66 at opposite ends thereof wherein one of the pivotal connection means 64 and 66 includes an axially elongated opening 68 for permitting limited axial movement of the member 62 with respect to its point of connection. Member 62 is particularly illustrated in FIG. 7 and includes a generally tubular body. The connection means 64 and 66 includes a pair of connecting ears extending axially from each end of the tubular body of the member 62. The ears of each pair are parallel and include apertures in axial alignment for receiving the pivot shafts 30 and 58. The ears 64 which are connected to the attachment means 15 are offset from the axis of the tubular body of the member 62 to position the lost motion connection means 42 below the sides of the lever arm means 18.

The apertures 70 in the pair of ears 64 are generally circular and conform to the size of the pivot shaft 58 which is supported by the attachment means. The apertures in the pair of ears 66, however, comprise elongated slots 68 which allow movement of the member 62 relative to the pivot shaft 30 to which it is attached. As shown in FIG. 5, downward pivotal movement of the front end of the ski is precluded since the pivot shaft 30 is at the end of the slot 68. However, upward pivotal movement of the front end of the ski is permitted since the pivot shaft 30 can move generally upwardly and to the left as viewed in FIG. 5 in the slot 68. This movement is shown particularly in FIG. 6 which is similar to the position of the elements described in FIG. 4 above.

The lost motion connection means 42 also includes spring means comprising the coil spring 72 for resisting axial movement of the member 62 with respect to the pivot shaft 30. The coil spring 72 therefore urges the ski 10 toward the horizontal position when the front end thereof is titled above the horizontal plane. The coil spring 72 is disposed within the tubular body of the member 62 and includes a seating plug 74 disposed at one end thereof having an arcuate groove therein for seating engagement against the cylindrical housing of the pivot shaft 30. The coil spring 72 is maintained within the tubular body of the member 62 by a cross member 76 which is welded between the sides of the member 62.

The second embodiment of the lost motion connection means 42 functions in the same general manner as described in the first embodiment. Consequently, in both embodiments, the lost motion connection means 42 precludes downward pivotal motion of the front end of the ski 10 substantially below the horizontal plane while permitting the front end of the ski 10 to pivot above the horizontal plane.

This invention has been described in an illustrative manner, and it is to be understood that the terminology which has been used is intended to be in the nature of words of description rather than of limitation.

Obviously, many modifications and variations in the instant invention are possible in light of the above teachings. It is, therefore, to be understood that the invention may be practiced otherwise than as specifically described and yet remain within the scope of the depending claims.

The embodiments of the invention in which an exclusive property or privilege is claimed are defined as follows:

1. A suspension assembly adapted for attachment between the vehicle ski and the vehicle body of a skisupported vehicle comprising: support means, lever arm means pivotally attached to said support means, resilient means operably connected between said lever arm means and said support means for resisting the pivotal motion of said lever arm means, pivotal attachment means for providing pivotal attachment of said lever arm means to the vehicle body, lost motion connection means bridging said pivotal attachment means for limiting the pivotal motion between said pivotal attachment means and said assembly, and mounting means for attaching said support means to the ski.

2. An assembly as set forth in claim 1 wherein said lost motion connection means includes spring means for urging recovery of the lost motion.

3. an assembly as set forth in claim 1 wherein said lost motion connection means includes a first member pivotally connected to said attachment means and a second member pivotally connected to said support means and in telescoping relation with said first member.

4. An assembly as set forth in claim 3 wherein one of said members includes stop means engageable with the other of said members for limiting outward telescopic motion therebetween to a predetermined outwardmost position.

5. An assembly as set forth in claim 4 including spring means for urging said members to said outwardmost position.

6. An assembly as set forth in claim 5 wherein said spring means comprises a coil spring.

7. An assembly as set forth in claim 5 wherein said first and second members are generaly tubular, said first member being telescopically disposed within said second member.

8. An assembly as set forth in claim 7 wherein each of said tubular members includes a pair of axially extending connecting ears for pivotally connecting said members to said attachment means and said support means.

9. An assembly as set forth in claim 8 wherein said attachment means includes a shaft housing mounted thereto and a pivot shaft disposed in said housing, and said connecting ears of said first member each includes an aperture for pivotal attachment to said shaft.

10. An assembly as set forth in claim 9 wherein said support means includes a pivot shaft and said connecting ears of said second member each includes an aperture for pivotal attachment to said shaft.

11. An assembly as set forth in claim 10 wherein said spring means includes seating plugs, each having an arcuate groove for engaging an adjacent arcuate member.

12. An assembly as set forth in claim 8 wherein said stop means includes at least one flange member extending radially from said first member and adapted to engage said second member.

13. An assembly as set forth in claim 12 wherein said resilient means includes a hydraulic piston member and a coil spring member.

14. An assembly as set forth in claim 12 wherein said support means includes a pair of elongated, upstanding flange members in parallel relationship adapted for mounting parallel to the axis of the ski.

15. An assembly as set forth in claim 14 wherein said support means includes a first pivot shaft for pivotally mounting said lever arm means and said lost motion connection means and a second pivot shaft for mounting said resilient means thereto.

16. An assembly as set forth in claim 12 wherein said mounting means includes a mounting flange connected to said support means and fastener members for securing said flange to the ski.

17. An assembly as set forth in claim 1 wherein said lost motion connection means includes a member having pivotal connection means at opposite ends thereof wherein at least one of said pivotal connection means includes an axially elongated opening for permitting limited axial movement of said member independently of said connection.

18. An assembly as set forth in claim 17 wherein said lost motion connection means includes spring means for resisting axial movement of said member.

19. An assembly as set forth in claim 17 wherein said member includes a tubular body and a pair of connecting ears extending axially from each end thereof, each ear of one of said pairs including said axially elongated opening.

20. An assembly as set forth in claim 19 wherein one pair of ears is radially offset from the axis of said tubular body.

21. An assembly as set forth in claim 19 including spring means disposed within said tubular body for resisting axial movement thereof.

22. An assembly as set forth in claim 21 wherein said spring means includes a coil spring.

23. An assembly as set forth in claim 22 wherein said attachment means includes a shaft housing mounted thereto and a pivot shaft disposed in said housing and said connecting ears at one end of said member including apertures for pivotal attachment to said shaft.

24. An assembly as set forth in claim 23 wherein said support means includes a pivot shaft and said connecting ears at the other end of said member from said attachment means including said elongated opening for attachment to said shaft for permitting pivotal and axial movement between said shaft and said member.

25. An assembly as set forth in claim 24 wherein said spring means includes a seating plug having an arcuate groove for seating engagement with said shaft.

26. An assembly as set forth in claim 24 wherein said resilient means includes a hydraulic piston member and a coil spring member.

27. An assembly as set forth in claim 24 wherein said support means includes a pair of elongated, upstanding flange members in parallel relationship adapted for mounting parallel to the axis of the ski.

28. An assembly as set forth in claim 27 wherein said support means includes a first pivot shaft for pivotally mounting said lever arm means and said lost motion connection means and a second pivot shaft for mounting said resilient means thereto.

29. A suspension assembly for a snowmobile ski comprising: a ski, support means mounted to said ski, lever arm means pivotally attached to said support means, resilient means operably connected between said lever arm means and said support means for resisting the pivotal motion of said lever arm means, pivotal attachment means for providing pivotal attachment of said lever arm means to the snowmobile, lost motion connection means bridging said pivotal attachment means for limiting the pivotal motion between said pivotal attachment means and ski whereby said ski is normally disposed in a plane substantially parallel to the longitudinal axis of the snowmobile and is precluded from pivotal motion in which the front of said ski moves away from the snowmobile but permits pivotal motion in which the front of said ski moves towards the snowmobile.

* * * * *